Jan. 14, 1947.        O. C. SCHMITZ        2,414,172
WHEEL
Filed May 29, 1943        2 Sheets-Sheet 1

Inventor
Oswin C. Schmitz,
By McMorrow and Berman
Attorneys

Jan. 14, 1947.  O. C. SCHMITZ  2,414,172
WHEEL
Filed May 29, 1943  2 Sheets-Sheet 2

Inventor
Oswin C. Schmitz,

By McMorrow and Berman
Attorneys

Patented Jan. 14, 1947

2,414,172

UNITED STATES PATENT OFFICE 2,414,172

WHEEL

Oswin C. Schmitz, Golva, N. Dak.

Application May 29, 1943, Serial No. 489,037

2 Claims. (Cl. 152—334)

This invention relates to wheels for motor vehicles and preferably for vehicles of light weight and which are required to travel over land under all conditions or through water and where traction for a conventional type of wheel will be practically unattainable.

The primary object of the invention is the provision of a wheel wherein the diameter and width thereof will be much greater than the average wheel and its tire and will be sealed against the entrance of water therein whereby the sinking of the wheel in mud or snow will be greatly retarded and will have buoyancy in water to assist in floating the vehicle.

Another object of this invention is the provision of an improved pneumatic cushion tread consisting of a plurality of closely related pneumatic tires that will provide a maximum amount of cushioning effect to the wheel as well as traction in snow or mud and will assist in propelling the vehicle through water.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a wheel constructed in accordance with my invention.

Figure 1:
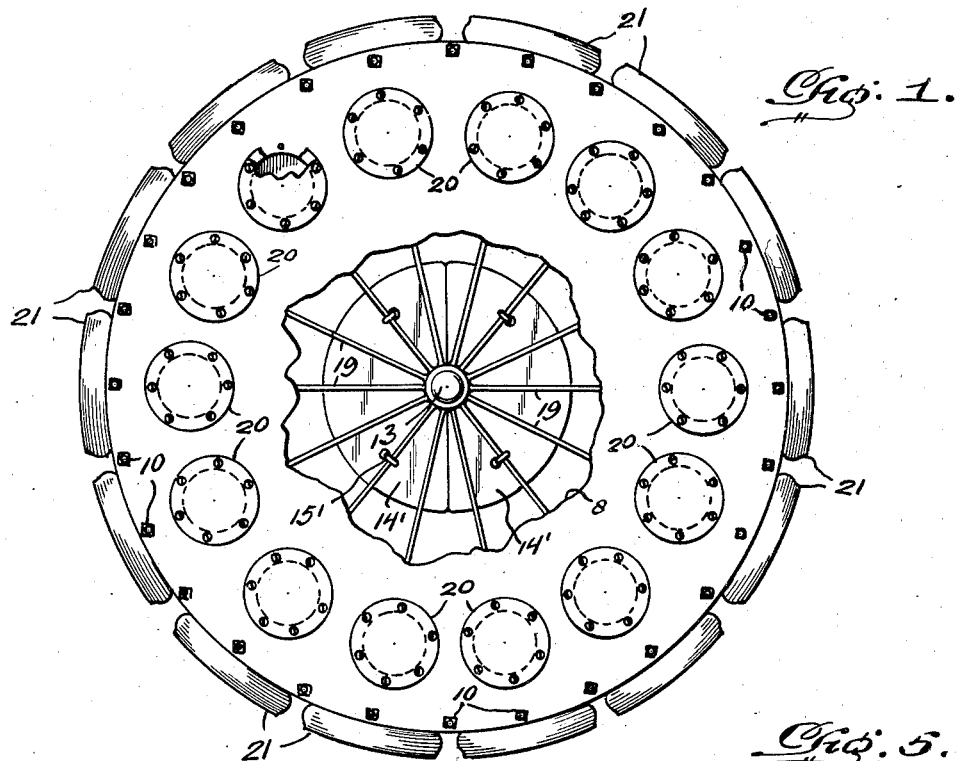
Figure 6:
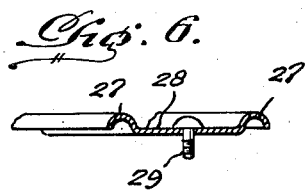
Figure 6 is a sectional view taken on the line 6—6 of Figure 5.
Figure 5:
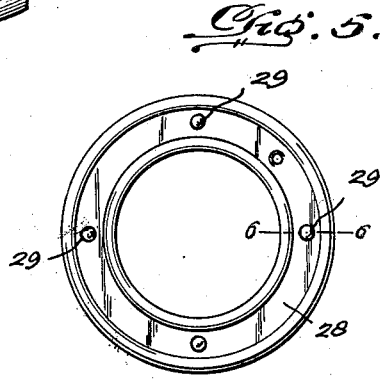
Figure 5 is a side elevation illustrating one of the tire securing members.

Referring in detail to the drawings, the numeral 5 indicates as an entirety a watertight wheel having a diameter and width much greater than the usual type of motor vehicle wheel and its tire and consists of an annular member 6 provided with inwardly extending attaching flanges 7 to which closure plates 8 and 9 are secured by fasteners 10. Gaskets 11 are arranged between the plates 8 and 9 and the flanges 7 of the annular member 6 to exclude water from the interior of the wheel.

The plate 9 is provided with an axle opening to receive a hub 13, a portion of which is screw threaded, as shown at 14, and has threaded thereon a retaining nut 15. Positioned between the nut 15 and the plate 9 is a gasket 16. The hub 13 is provided with a flange 17 and positioned between the latter and the plate 9 is a gasket 18. The gaskets 16 and 18 are for the purpose of preventing water from seeping into the wheel about the hub. The hub is provided with spokes 19 which are formed on or secured in any suitable way to the annular member 6. The hub 13 may be constructed to receive either a rear axle or a front axle of a motor vehicle.

The plate 8 is provided with a series of removable plates 20 to give access to the interior of the wheel for the purpose of making adjustments and also for operating the fasteners employed for securing the tread on the annular member 6. The plates 20 are secured in place by bolts or like fasteners and gaskets are arranged between said plates 20 and the plate 8.

The annular member 6 forms the rim or felly of the wheel and the tread thereof is in the form of a plurality of closely arranged pneumatic tires 21 each consisting of an inner tube 22 and a casing 23. The inner tube 22 is provided with an inflating valve 24 and the casing 23 has a tread 25. The casing 23 has beads 26 seated in grooves 27 of an anchoring plate 28 of annular formation and detachably secured to the annular member 6 by bolts or similar fasteners 29.

The diameter of the tires 21 is slightly less than the width of the annular member 6 and the tires are spaced an equal distance apart about the annular member so as to provide an efficient cushion tread for the annular member capable of providing a maximum amount of traction.

Figure 2:
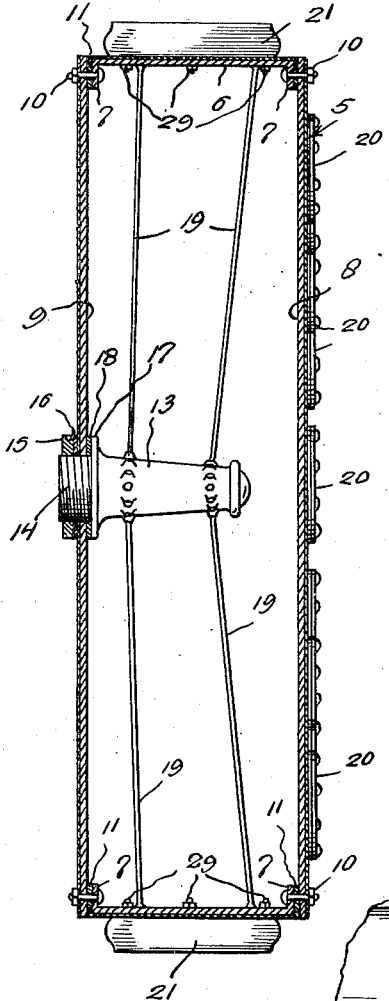
Figure 2 is a transverse sectional view illustrating the wheel.
Figure 3:
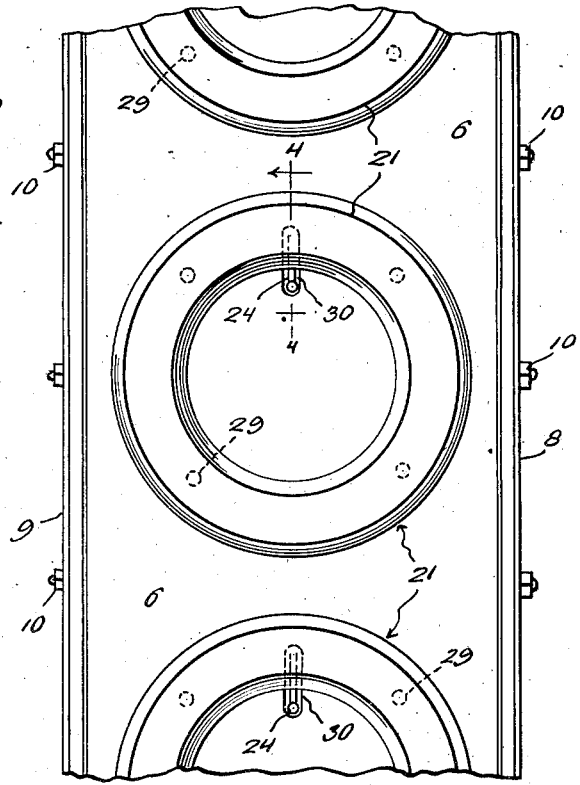
Figure 3 is a fragmentary plan view illustrating a portion of the tread of the wheel.
Figure 4:
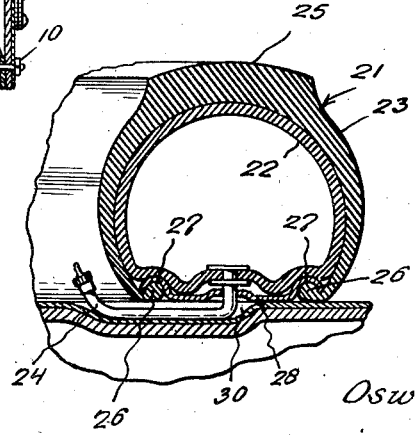
Figure 4 is a sectional view taken on the line 4—4 of Figure 3.

By referring to Figures 1 and 2 it will be seen that the treads 25 of the casings 23 are formed on one side of the casings instead of the peripheries as usual in conventional tire construction and the beads 26 are formed on the other side of the casings next to the rim. The annular member 6 is provided with recesses, as shown at 30, to accommodate the inflating valve 24. To remove anyone of the tires 21 from the wheel, it is only necessary to detach the annular plate of that tire from the annular member 6 of the wheel, the fasteners 29 being operated by the person reaching through the hand openings normally closed by the hand opening plates 20.

It is preferable that the exterior faces of the plates 8 and 9 as well as the annular member be provided with a coating of rubber substance to prevent snow, mud and the like from adhering thereto.

Either or both of the plates 8 and 9 may be removed and weights 14' may be mounted on the hub and detachably secured to the spokes by suitable clamps 15' when desiring to increase the traction of the wheel by adding weight thereto. This may be desirable when using the wheel on a tractor or similar device. Also the plates 8 and 9 may be left off when the wheel is thus used.

Figure 7:
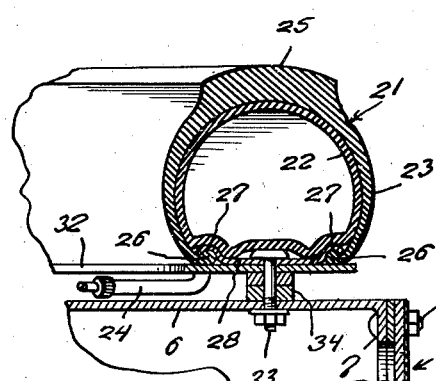
Figure 7 is a fragmentary transverse sectional view, ilustrating a modified form of my invention.

In the modified form of my invention, as shown in Figure 7, an annular plate 32 is mounted on the annular member 6 of the wheel by bolts 33 and spaced therefrom by spacers 34. The bolts also secure the spacers 34 in place. The anchoring plates 23 rest on the annular plate 32 and are secured thereto by the bolts 33. This construction arranges the tires a distance from the annular member 6 of the wheel so that any dirt or the like entering the annular tires may pass therefrom by way of the spaces provided between the annular plate 32 and the annular plate 6 of the wheel, consequently preventing the tires from clogging with dirt and thereby permitting the tires to retain their maximum amount of traction. The inflating valves 24 extend through the plate 32 and are accommodated in the space between said plate 32 and the annular member 6, eliminating the use of the grooves 30 in this form of my invention.

From the foregoing description taken in connection with the accompanying drawings, it will be seen that a motor vehicle wheel has been provided which will be capable of operation within mud, snow or the like without sinking deeply therein and also when within water will have buoyancy to assist in keeping the vehicle afloat. Also when the wheel is rotated by power in the water, the tires 21 thereon will assist in the propulsion of the vehicle.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a vehicle wheel tread, an annular rim having a wide tread surface, a plurality of pneumatic annular shaped tire shoes arranged in circumferentially spaced apart relation about the tread surface of the rim and spaced an equal distance from each other and each including beads at its side disposed next to the tread surface of the rim and an annular tread disposed on its opposite or outermost side, annular attaching plates detachably secured to the rim in circumferentially spaced apart relation and positioned in the shoes and provided with grooves receiving the beads, and inflatable tubes in the shoes and bearing against the latter and the attaching plates.

2. In a vehicle wheel tread, an annular rim having a wide tread surface, a plurality of pneumatic annular shaped tire shoes arranged in circumferentially spaced apart relation about the tread surface of the rim and spaced an equal distance from each other and each including beads at its side disposed next to the tread surface of the rim and an annular tread disposed on its opposite or outermost side, annular attaching plates detachably secured to the rim in circumferentially spaced apart relation and disposed over the tread surface of the latter and in spaced relation thereto and positioned in the shoes and provided with grooves receiving the beads forcing the beads against the attaching plates, and inflatable tubes in the shoes and bearing against the latter and the attaching plates.

OSWIN C. SCHMITZ.